Figure 4:
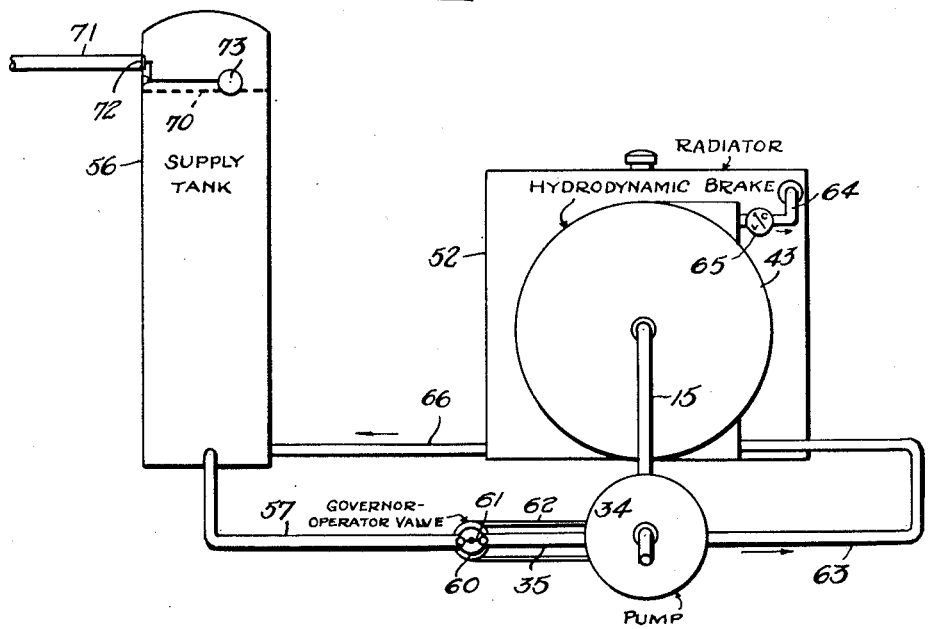

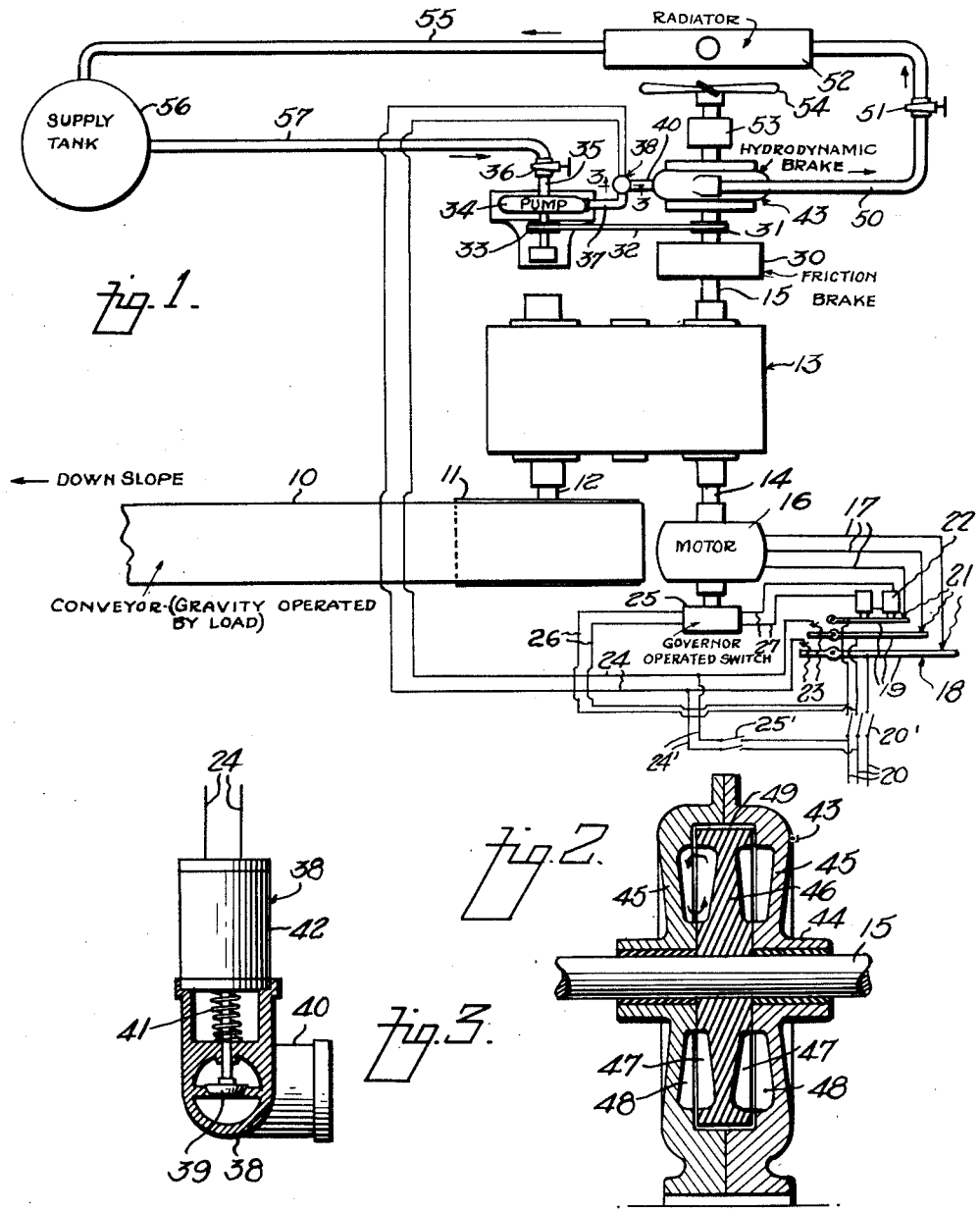

Patented May 27, 1947

2,421,056

UNITED STATES PATENT OFFICE 2,421,056

CONVEYOR CONTROL SYSTEM

George E. Dake and Edgar F. Speiden, Parkersburg, W. Va., assignors to The Parkersburg Rig & Reel Company, Parkersburg, W. Va., a corporation of West Virginia Application December 27, 1943, Serial No. 515,768

17 Claims. (Cl. 198—203)

This invention relates to conveyor control systems and more particularly to a gravity operated conveyor system wherein conveyor speeds are controlled by the novel use of a hydrodynamic brake in conjunction therewith.

Hydrodynamic brakes have come more and more into general use for various purposes such, for example, as means for limiting the speed of piping lowered into oil wells, setting a maximum speed for heavy vehicles such as trucks and buses without using the conventional braking systems of the vehicles, etc.

An important object of the present invention is to provide a novel hydrodynamic brake control system which adapts a brake of this character for use in systems such as belt conveyor systems in which the load on the belt provides the power for operating the belt and wherein the belt is initially driven by power until the load on the belt is sufficient to render the use of power unnecessary, the hydrodynamic brake then automatically functioning to assume control of the conveyor belt to limit its speed of movement.

A further object is to provide, in a system of this character, an automatic control system wherein the hydraulic brake is normally inoperative or ineffective for providing a braking action, and wherein it becomes automatically operative when its braking function is required to limit the speed of movement of some mechanism.

A further object is to provide an automatic control system employing a source of power for driving a given mechanism and a brake for limiting the speed of operation of such mechanism, the automatic system being operative in conjunction with the source of power when the latter is rendered inoperative for driving and it becomes necessary or desirable to limit the speed of the mechanism to be controlled.

A further object is to provide a system of the character just referred to wherein a hydrodynamic brake is arranged to control the speed of operation of a given mechanism, the system having means operating in conjunction with the brake to automatically supply fluid to the brake to render it operative when desired.

Other objects and advantages of the invention will become apparent during the course of the following description.

In the drawings we have shown several embodiments of the invention. In this showing—

Figure 5:
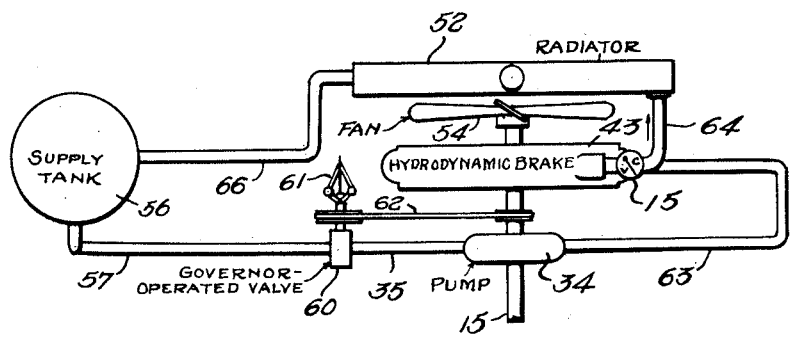
Figure 6:
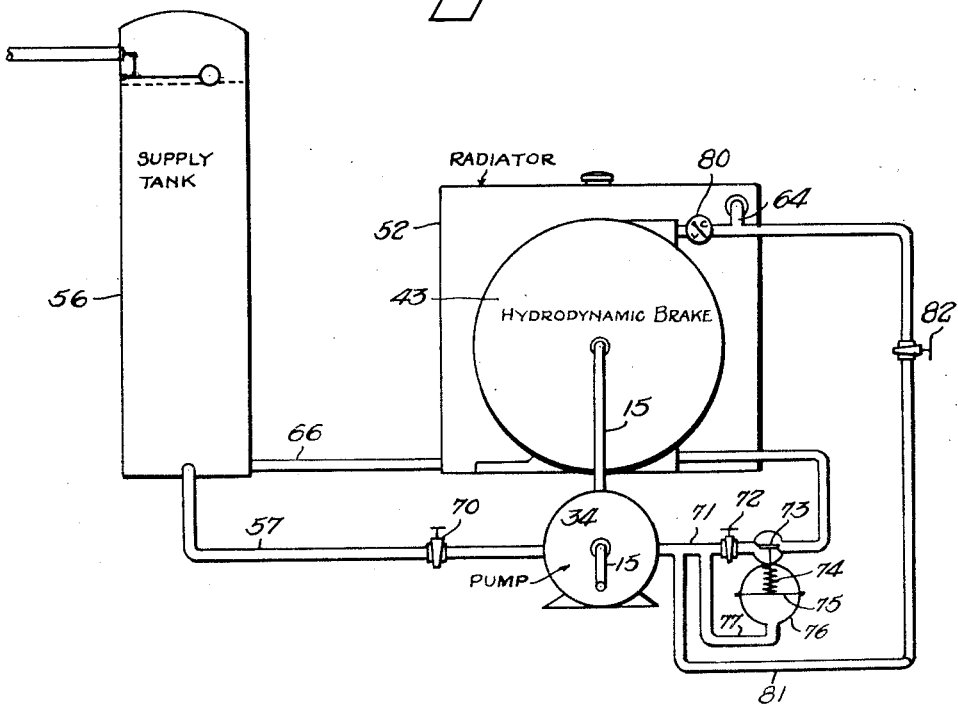
Figure 7:
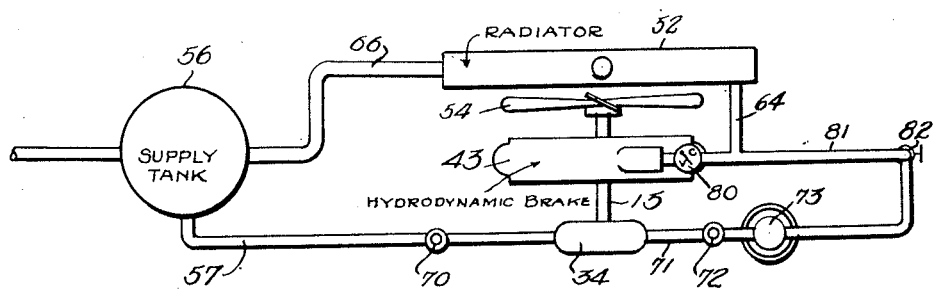

Figure 1 is a diagrammatic plan view of one form of control system,

Figure 2 is a central sectional view through a simple type of hydrodynamic brake showing the type of brake in connection with which the present system is particularly adapted for use, Figure 3 is a detail sectional view through a solenoid control valve taken substantially on line 3—3 of Figure 1, parts being shown in elevation, Figure 4 is a diagrammatic side elevation showing a modified type of system, Figure 5 is a diagrammatic plan view of the same, the relative positions of the parts being somewhat changed for the purpose of illustration, Figure 6 is a diagrammatic side elevation of a further modified form of system, and, Figure 7 is a plan view of the same showing some of the parts altered in their positions with respect to Figure 6 for the purpose of illustration.

Referring to Figure 1, the numeral 10 designates a conveyor belt having one end passing around a pulley 11. The conveyor mechanism is of the type employed for conveying material such as coal from a relatively high point to a relatively low point whereby the forces of gravity of the material on the belt 10 provides all of the power necessary for the operation of the conveyor when the latter is loaded. In Figure 1 the right hand end of the conveyor belt is the higher end, the belt sloping downwardly toward the left as indicated by the arrow and the legend "Down slope."

The pulley 11 is mounted on the power output shaft 12 of a speed reduction mechanism indicated as a whole by the numeral 13. This mechanism may be of any desired type and includes a power input or drive shaft 14 extending entirely through the mechanism 13 and projecting from the opposite side thereof as at 15. Obviously, the shafts 12 and 14 are respectively the low and high speed shafts of the speed reduction mechanism 13 and the shaft 14 is driven by a source of power which may be, but is not necessarily, in the form of a 3-phase motor 16 to which power is supplied through the usual wires 17. Power is supplied to the motor by operation of a relay switch indicated as a whole by the numeral 18 diagrammatically represented as including three contact arms 19 respectively connected to the three wires 20 leading to the source and provided with a main control switch 20'. The motor 16 is energized when the respective switch arms 19 engage the contacts 21 of the respective wires 17. The relay switch is normally biased to open position and is movable to the closed position shown in Figure 1 by magnets 22 energizable in the manner to be described. When the relay switch is open, two of the arms 19 engage the respective contacts 23 of wires 24 controlling a solenoid valve to be referred to later. If desired, wires 24' controlled by a switch 25' may lead from the wires 24 to a source of current, for example, by being connected across two of the wires 20 between the switch 20' and the source. The purpose of this arrangement will be referred to later.

The motor 16 is provided with a governor switch indicated by the numeral 25 and two wires 26 lead to the governor switch from any suitable source of current. For example, the wires 26 may be respectively connected to two of the wires 20 between the switch 20' and the relay switch 18. From the governor switch 25, wires 27 lead to the respective magnets or solenoids 22, these elements being connected in series as shown. It will become apparent that the governor switch 25 is normally closed to energize the switch magnets 22 and opens when the motor 16 reaches its synchronous speed to deenergize the magnets 22 and open the relay switch. This operation will be further referred to later.

The shaft 15 is diagrammatically shown as being provided with a brake 30 which may be of any desired type for bringing the apparatus to a complete stop when desired. Any desired type of manually or power operated friction brake may be employed for this purpose. The shaft 15 also carries a drive pulley 31 around which passes a belt 32 and this belt drives the pulley 33 of a suitable non-positive pump 34, preferably of the centrifugal type. This pump obviously will be driven whenever the shaft 15 is rotated and is supplied with fluid, preferably water, through a pipe 35 in which is arranged an adjustable plug valve 36. The pump outlet is indicated by the numeral 37 and this outlet is provided with a solenoid operated valve indicated as a whole by the numeral 38.

The solenoid operated valve may be of the type generally shown in Figure 3, an ordinary poppet valve 39 controlling the flow of water from the pump outlet 37 to the valve outlet pipe 40, the valve being urged to closed position by a spring 41. A conventional solenoid 42 is energizable to open the valve 39 and the wires 24 are connected to the solenoid as shown in Figures 1 and 3. It will become apparent that when the motor 16 is energized the valve 39 is closed, and that immediately upon deenergization of the motor 16, the valve 39 will open for the flow of water from the pump 34 through the valve outlet 40.

The valve outlet is connected to the inlet of a fluid friction brake, shown in the present instance as a hydrodynamic brake 43 which may be of the well known conventional type generally illustrated in section in Figure 2. As shown, the shaft 15 is journalled in bearings 44 carried by stator elements 45 in which is arranged a rotor 46, the rotor and stator elements being respectively provided with pockets 47 and 48 for the circulation of water to effect the dynamic braking action as is well known. The pipe or outlet 40 supplies the water to the pockets 47 and 48 and the clearance between the rotor and stator elements of the brake permits the radially outward flow of water into an annular space 49 surrounding the stator 46, and from this space the water flows through an outlet pipe 50 (Figure 1). Thus it will be apparent that there is a constant flow of water through the brake 43 as is necessary because of the heat generated in the water due to the braking action.

The pipe 40 is provided with an adjustable plug valve 51 and the pipe leads to a heat exchanger 52 which may be in the form of a conventional radiator. Between the brake 43 and the radiator the shaft 15 may be mounted in a suitable relatively heavy bearing 53 and the end of the shaft may be provided with a fan 54 for the circulation of air through the radiator 52 to dissipate heat from the water circulating therethrough. From the radiator 52, the water flows through a pipe 55 to a supply tank 56, and from this pipe water flows through a pipe 57 leading to the plug valve 36.

In the form of the invention described above, the supplying of water to the hydrodynamic brake 43 to determine the operativeness thereof is controlled by the solenoid-operated valve 38, and the operation of this valve is determined, in turn, by the operativeness of the motor 16. While the operation of the motor 16 is directly dependent on its speed of operation, the operation of the valve 38 is directly dependent on the operativeness of the motor 16 and not on its speed. In Figures 4 and 5 of the drawings we have shown an automatic control system wherein the supplying of water to the hydrodynamic brake is directly dependent upon the speed of operation of the apparatus, the rate of supply of water to the hydrodynamic brake being variable to vary the braking action in accordance with the speed of the mechanism being controlled.

Referring to Figure 5 it will be noted that the hydrodynamic brake 43 and pump 34 may both be directly mounted on the shaft 15. Instead of the supply tank 56 having its pipe 57 connected to the pump through an adjustable plug valve, the pipe 57 leads to a governor-operated valve 60 and thence to the inlet pipe 35 of the pump 34. The governor 61 of the valve 60 may be driven from the shaft 15 by any suitable means such as a belt 62 and as the speed of the shaft 15 increases the governor 61 will progressively open the valve 60 to increase the supply of water to the pump 34 and thence directly to the hydrodynamic brake 43 through a pipe 63. From the brake 43 an outlet pipe 64 conveys water to the radiator 52, and the pipe 64 may be provided with a check valve 65.

If desired, float controlled means may be provided for maintaining water in the supply tank to a predetermined level as indicated by the dotted line 70 in Figure 4. A supply pipe 71 from a source may supply water to the tank 15 and the flow of such water may be controlled by a valve 72 connected to a float 73 within the tank 56.

In Figures 6 and 7 of the drawings a control system is illustrated wherein the braking action of the hydrodynamic brake is directly dependent upon pressures developed by the circulating pump, which pressure in turn is obviously dependent upon the speed of operation of the brake. The main parts of the apparatus are identical with those previously described and the same reference numerals have been employed to indicate the identical parts. The pipe 57 from the supply tank feeds directly to the pump as in Figure 1, and is preferably provided with a flow regulating valve 70 which may be of any desired type such as a globe, plug or gate valve. The pump is provided with an outlet 71 provided with a flow regulating valve 72 similar to the valve 70. The pipe 71 leads to the inlet connection of the hydrodynamic brake and between the valve 72 and the brake there is arranged an automatic valve 73 spring pressed toward closed position as at 74. A diaphragm 75 is connected to the stem of the valve 73 and is arranged in a casing 76 having its side opposite the spring 74 connected by a branch pipe 77 to the pipe 71 between the pump 34 and valve 72. The opening of the valve 73 is dependent upon the building up of pressure beneath the diaphragm 75 and this pressure, in turn, is dependent upon the speed of rotation of the pump.

The outlet connection of the brake 43 leads to the radiator 52 through a pipe 64 and this pipe preferably is provided with a check valve 80 opening outwardly with respect to the brake. This arrangement may be identical with that shown in Figure 4.

The mechanism thus far described in Figure 6 is fully operative provided the pump 34 is non-positive, that is, of the centrifugal type. If a positive-displacement pump 34 is employed it will be obvious that the system thus far described cannot take care of the fluid displaced by the pump even while the latter is rotating at low speeds. If such a positive pump is employed, therefore, a by-pass pipe 81 is tapped into the pipe 71 between the pump 34 and valve 72 and the other end of the pipe 81 is connected to the pipe 64. A manually operated valve 82 is arranged in the pipe 81 to govern the rate of flow of liquid through the pipe 81 to determine the opening movement of the valve 73 by controlling pressures beneath the diaphragm 75 in proportion to the speed of operation of the pump 34, as will be referred to in detail below.

The operation of the form of the apparatus shown in Figures 1, 2 and 3 is as follows:

The conveyor 10 is of the type for conveying articles, packages or materials downwardly from a relatively high loading point to a relatively low discharge point. Many conveyors of this type are employed, for example, in conveying coal. It is necessary to provide a source of power for driving the conveyor but after the latter is fully loaded it is unnecessary to drive the conveyor since the latter can be gravity operated by the load which it is carrying. The present invention is particularly adapted for use in connection with a conveyor of such character and provides novel control means whereby the conveyor is power-operated only when necessary, and wherein the hydrodynamic brake predetermines a maximum speed of operation of the conveyor when it is being gravity operated.

The main control switch 20' may be connected in the line wires 20 and this switch is closed to render the system operative. The wires 26 may be supplied with current by being connected across two of the wires 20 between the switch 20' and the relay switch 18, as stated. Below a predetermined speed to be referred to the governor operated switch 25 electrically connects the wires 26 and 27 and when the main control switch is closed to initiate the operation of the apparatus, the magnets or solenoids 22 will be energized to move the relay switch 18 to closed position and thus start the motor 16. The motor drives the conveyor belt 10 through the speed reduction gearing 13, such mechanism being conventional as will be obvious.

All of the elements connected to the shaft 15 rotate with the motor shaft 14 and accordingly the pump 34, hydrodynamic brake 43 and fan 54 will be driven when the motor 16 is operated. When the relay switch 18 is closed, as stated, the circuit for the solenoid valve 38 will be broken at the contacts 23 and no water can flow between pipes 37 and 40 to the hydrodynamic brake 43.

Accordingly, this brake will be freely driven by the motor 16. The motor speed will be accelerated until its full load operating speed is reached, whereupon the load is applied to the higher end of the conveyor. As the load is increasingly applied it accelerates the speed of the conveyor. The load on the motor 16 will progressively decrease and the speed of the motor will increase until the synchronous speed of the motor is reached. At this point, governor operated switch 25 will break the circuit between wires 26 and 27 and the relay switch 18 will open to deenergize the motor and close the circuit for the solenoid valve 38 across the contacts 23.

The motor 16 will thereupon idle and the conveyor will be driven by the load thereon. The opening of the valve 38 permits water to flow from the centrifugal pump 34 to the hydrodynamic brake 43, thus rendering such brake operative for preventing the conveyor from being driven above a predetermined maximum speed. As is well known, the braking action of a hydrodynamic brake varies as a function of the speed and is always greater than the first power of the speed, and the brake 43 is therefore highly efficient in preventing over-speeding of the conveyor.

If, at any time, the load on the conveyor is insufficient to operate it at a speed corresponding to the synchronous speed of the motor 16, the governor-operated switch 25 will close the relay switch 18 and close the solenoid-operated valve 38 to cut off the supply of liquid to the brake 43. The motor 16 will then positively drive the conveyor. If the speed of the motor again increases to its synchronous speed, the operation previously described will be repeated, the motor circuit being broken so that the motor will idle, and the valve 38 being open to supply liquid to the hydrodynamic brake 43.

While the pump 34 maintains a circulation of liquid through the brake 43 when the latter is operating, the brake is preferably of the self-circulating type, as shown, for example, in the patent to Robert Griffin De La Mater, No. 1,992,911, granted February 26, 1935. A self-circulating hydrodynamic brake is highly advantageous for the reason that whenever the valve 38 closes, the brake 43 will promptly eject all liquid therefrom and become wholly inoperative. Thus, except for the negligible period required for evacuating the brake 43, no braking drag tends to retard the motor 16 when the latter is power-driving the conveyor.

Referring to Figure 2 the general type of hydrodynamic brake 43 is illustrated. The braking action is accomplished by the cutting through of the brake liquid circulating between the pockets 47 and 48 as indicated by the arrows in Figure 2. It will be apparent that there is some clearance provided between the rotor and stator elements and the centrifugal force developed by the rotor 46 constantly feeds a certain amount of the braking liquid outwardly into the annular pace 49 to be discharged through the pipe 50 (Figure 1). It is such action which renders the brake 43 self-circulating. While sufficiently accurate adjustment of the braking action can be secured by adjusting the flow of liquid to the brake by adjusting the valve 36, the use of a similar valve 51 in the outlet pipe 50 of the brake is desirable. Adjustment of the valve 51 limits the rate of liquid discharge from the brake 43 by its self-circulating characteristics, thus insuring the maintenance of the proper quantity of liquid within the brake to effect the desired braking action at all times when the motor 16 is idling.

The switch 25' provides an auxiliary control mechanism for the solenoid valve 38 for any emergency or temporary conditions which make it desirable to control the conveyor by means of the hydrodynamic brake wholly independently of the motor 16. For example, if the conveyor should be stopped when fully loaded and held stationary by the friction brake 30, it may be desired, after the friction brake is released, to permit the conveyor to accelerate by gravity from zero to maximum speed without the motor 16 being energized. Under the normal conditions of operation of the apparatus the governor switch 25 will deenergize the magnets 22 when a predetermined speed is reached, thus closing the circuit for the solenoid 38 across the contacts 23. Assuming that the switch 20' is open, the motor 16 will be deenergized and there will be no circuit completed to the governor switch 25 and the elements of the relay switch will remain in engagement with the contacts 23. However, the circuit through the solenoid valve 38 cannot be completed since the switch 20' is open. If it is desired that the hydrodynamic brake 43 function under such conditions, as when the friction brake 30 is released as discussed above, the switch 25' may be closed and the solenoid valve 38 will be opened to permit the flow of liquid to the hydrodynamic brake 43. This brake accordingly can be brought into operation wholly independently of the operation of the governor switch 25.

In Figures 4 and 5 of the drawings the supplying of liquid to the brake 43 is dependent upon the rotational speed of the shaft 15 and is not directly concerned with the energization of the motor 16. In the system shown in Figures 4 and 5, therefore, the wires 24 (Figure 1) contacts 23 and solenoid operated valve 38 are eliminated, and governor-operated valve 60 is arranged in the pipe 35 and performs substantially the same function as the valve 38. However, it will be apparent that whereas the valve 38 is either fully opened or closed, the valve 60 in Figures 4 and 5 varies the flow of liquid to the pump in accordance with the rotational speed of the shaft 15. The governor 61 may be set to start the opening of the valve 60 at a speed of the shaft 15 corresponding to the synchronous speed of the motor 16 (Figure 1). When such predetermined speed is reached, therefore, brake liquid will flow to the pump 34 to be pumped thereby to the brake 43 through the pipe 63. Any tendency for the rotational speed of the shaft 15 to increase will be followed by two results. In the first place the increased driving speed of the brake 43 will immediately increase the braking characteristics of the brake to tend to limit the speed of the shaft 15. In the second place, the increased speed of the shaft 15 will open the valve 60 to a further extent to increase the flow of water to the brake 43 to further increase the braking action and thus limit the speed of the shaft 15, and consequently the speed of the conveyor.

The pipe 64, if desired may be provided with the check valve 65 opening outwardly with respect to the brake 43. Obviously this valve will immediately close when substantially all of the liquid has been evacuated from the brake 43 and will remain closed when the brake is not being driven, thus preventing a back flow of water from the radiator to the hydrodynamic brake. The use of the check valve 65 is desirable only if there is an appreciable head of liquid above the outlet connection of the brake 43. Of course, manually adjustable valves may be provided anywhere in the pipe lines leading to and from the brake 43 as described above in connection with the valves 36 and 51 (Figure 1). The illustration of such valves in Figures 4 and 5 is believed to be unnecessary since their function will be identical with that previously described and their use in the system of Figures 4 and 5 is less necessary in view of the variable opening movement of the valve 60 and the consequent variable action of the brake 43 in accordance with its speed of operation.

In the form of the invention shown in Figures 6 and 7 the controlling of the hydrodynamic braking action is accomplished in accordance with pressures developed by the pump 34. Assuming that the pump 34 is of the non-positive type, water will be supplied constantly to the pump and the pressures developed in the pipe 71 will be proportional to the speed of operation of the pump. As previously stated, the pipe line 81 may be eliminated if a non-positive pump 34 is employed. The spring 74 is set to hold the valve 73 closed until the pressure beneath the diaphragm 75 is the pressure which will be developed by the pump 34 when the shaft 15 reaches the synchronous speed of the motor 16 (Figure 1). As soon as such synchronous speed is reached, pressure beneath the diaphragm 75 will start to open the valve 73 to supply water to the hydrodynamic brake 43. Any tendency of the speed of the shaft 15 to increase beyond such point will open the valve 73 to a greater extent and increase the rate of supply of water to the brake 43. The increased rate of flow of liquid to the brake and the increased speed at which the brake will be driven under such conditions will immediately provide a substantially increased braking action to limit the speed of rotation of the shaft 15 and consequently the speed of operation of the conveyor.

In Figures 6 and 7 manually operable valves 70 and 72 may be employed, if desired, to control the braking action. The valve 70 may be employed to predetermine a maximum rate of flow of liquid to the pump 34 within reasonable limits, and the valve 72 may be employed to tend to limit the maximum flow of liquid to the brake 43 if the valve 73 opens to a maximum extent. As a practical matter, either of the valves 70 or 72 may be employed, or the valve 73 may be designed to open to a limited maximum extent.

If a positive-displacement pump 34 is employed it will be obvious that such pump will always displace liquid into the pipe 71 regardless of its speed of operation. The use of such a pump requires some means such as the by-pass pipe 81 so that pressures built up beneath the diaphragm 75 will be dependent upon the speed of operation of the pump and not by the total liquid displacement thereof. The valve 82 will be adjusted to permit liquid displaced by the pump 34 to flow relatively freely from the pipe 71 through pipe 81 and thence to the radiator through pipe 64 whenever the pump 34 is being driven at a shaft speed which is below the synchronous speed of the motor 16 (Figure 1). Whenever such speed is increased the valve 82 acts to restrict the flow of liquid through pipe 81 so that the total displacement of the pump 34 cannot be accommodated through the by-pass pipe 81. Above the synchronous motor speed, therefore, back pressure will act on the diaphragm 75 to open the valve 73 and thus supply liquid to the brake 43. Thus in the form of the invention shown in Figures 6 and 7 the braking action is automatic and takes place to the necessary extent to predetermine the maximum speed of the shaft 15 and the maximum speed of operation of the conveyor. The function of the check valve 80 obviously is identical with that of the check valve 65 (Figure 4) and need not be specifically described.

The use of the supply tank 56 is desirable for the reason that the brake 43 develops a substantial amount of heat. When a supply tank is used, the water flowing from the radiator through pipe 66, while substantially cooler than the water entering the radiator is relatively hot and flows into the body of water in the supply tank to be mingled therewith and further cooled. Obviously the supply tank itself dissipates substantial heat and the water entering the pump in each system described will be substantially cooler than the water leaving the radiator.

From the foregoing it will be apparent that either of the systems described is particularly efficient for use in connection with driving systems for conveyors which slope downwardly from the loading point so that the force of gravity of the load is sufficient to operate the conveyor. The present system efficiently utilizes a power source to initiate the conveyor operation but permits the load on the conveyor to operate the latter without permitting the conveyor to be operated at excessive speeds. In each case the hydrodynamic brake 43 functions only when a braking action is desirable and never provides a drag on the motor when the latter is positively driving the conveyor. In each form of the invention any decrease in the load on the conveyor to the point where the load becomes insufficient to operate the conveyor will promptly result in the rendering of the brake 43 inoperative so that the power source can freely drive the conveyor.

It is to be understood that the forms of the invention herewith shown and described are to be taken as preferred examples of the same and that various changes in the shape, size and arrangement of parts may be resorted to without departing from the spirit of the invention or the scope of the subjoined claims.

We claim:

1. In a gravity conveyor of the type wherein a given load on the conveyor provides a sufficient gravitational force to operate the conveyor, a power source for operating the conveyor, a hydrodynamic brake having mechanical connection with the conveyor, and automatic means subject to operation as a result of operation of the conveyor above a predetermined maximum speed for supplying liquid to said brake to render it operative for braking the conveyor, said automatic means including a mechanism for rendering said power source inoperative while said brake is operative.

2. In a gravity conveyor of the type wherein a given load on the conveyor provides sufficient gravitational force to operate the conveyor, a hydrodynamic brake having a rotor mechanically connected to the conveyor, means tending to supply liquid to said brake to render it operative for effecting a braking action on the conveyor, a valve device between said means and said brake to normally prevent the flow of liquid to said brake, and automatic means subject to operation as a result of operation of said conveyor above a predetermined maximum speed for opening said valve means, said automatic means including a mechanism for rendering said power source inoperative while said brake is operative.

3. In a gravity conveyor, an electric motor for operating the conveyor, a hydrodynamic brake having mechanical connection with the conveyor, and governor-controlled means operated in accordance with the speed of operation of said motor for opening the circuit of the latter when the motor attains a predetermined speed, said governor-controlled means comprising a mechanism for rendering said brake effective for braking said conveyor simultaneously with the opening of the circuit through said motor.

4. In a gravity conveyor, an electric motor for operating the conveyor, a hydrodynamic brake having mechanical connection with the conveyor, and governor-controlled means operated in accordance with the speed of operation of said motor for opening the circuit of the latter when the motor attains a predetermined speed, said governor-controlled means comprising a relay switch, and electrically operated means controlled by said relay switch to be rendered operative when the motor circuit is opened for rendering said brake effective for braking said conveyor.

5. In a gravity conveyor, an electric motor for operating the conveyor, a hydrodynamic brake having mechanical connection with the conveyor, governor-controlled means operated in accordance with the speed of operation of said motor for opening the circuit of the latter when the motor attains a predetermined speed, means comprising a solenoid for rendering said brake effective for braking said conveyor, and means for energizing said solenoid simultaneously with the opening of the motor circuit.

6. In a gravity conveyor, an electric motor for operating the conveyor, a hydrodynamic brake having mechanical connection with the conveyor, a valve device normally closed and movable to open position to supply liquid to said brake to render it operative for braking the conveyor, and means operative when said motor attains a predetermined speed for simultaneously opening the motor circuit and opening said valve device.

7. In a gravity conveyor, an electric motor for operating the conveyor, a hydrodynamic brake having mechanical connection with the conveyor, a normally closed valve device for controlling the supply of liquid to said brake, electrically operable means energizable to open said valve device to supply water to said brake to render it operative for braking said conveyor, a relay switch controlling the circuits through said motor and through said electrically operated device, and governor-controlled means operated in accordance with the speed of operation of the system and operative when the motor attains a predetermined speed for altering the position of said relay switch to open the motor circuit and close the circuit through said electrically operated device.

8. In a gravity conveyor, a power source for operating the conveyor, a hydrodynamic brake having mechanical connection with the conveyor, a pump normally tending to supply water to said brake to render it effective for braking the conveyor, a control device for controlling the effectiveness of said pump for supplying water to said brake, and means subject to operation as a result of operation of the conveyor above a predetermined speed for rendering said control device operative for supplying liquid to said brake and for simultaneously rendering said power source inoperative.

9. Apparatus constructed in accordance with claim 8 provided with valve means adjustable wholly independently of said control device for determining the rate of flow of liquid through said brake.

10. Apparatus constructed in accordance with claim 8 wherein said pump is mechanically connected to the conveyor system to be driven therewith whereby the rate of pumping action and consequently the rate of flow of liquid to said brake varies in accordance with the speed of operation of said conveyor.

11. In a gravity conveyor, a power source for operating the conveyor, a hydrodynamic brake having mechanical connection with said conveyor, a pump for continuously tending to supply liquid to said brake for circulation therethrough to render the brake effective for braking the conveyor, a valve for controlling the flow of liquid from said pump to said brake, and means operative in direct proportion to the speed of operation of said conveyor and above a predetermined speed of operation thereof for rendering said motor inoperative and for simultaneously opening said valve for the flow of liquid to said brake.

12. In a gravity conveyor, a power source for operating the conveyor, a hydrodynamic brake having mechanical connection with said conveyor, a pump for continuously tending to supply liquid to said brake for circulation therethrough to render the brake effective for braking the conveyor, said pump being mechanically connected to the conveyor system to be driven therewith whereby said pump tends to progressively increase its output as the speed of operation of the conveyor increases, a valve for controlling the flow of liquid to said brake, means for progressively opening said valve as the speed of operation of the conveyor progressively increases, and governor-operated means for rendering said power source inoperative when it attains a predetermined maximum speed.

13. In a gravity conveyor, a power source for operating the conveyor, a hydrodynamic brake having mechanical connection with said conveyor, a pump for continuously tending to supply liquid to said brake for circulation therethrough to render the brake effective for braking the conveyor, said pump being mechanically connected to the conveyor system to be driven therewith whereby said pump tends to progressively increase its output as the speed of operation of the conveyor increases, a valve for controlling the flow of liquid to said brake, means operative in accordance with increased pump outlet pressures for opening said valves, and governor-operated means for rendering said power source inoperative when it reaches a predetermined maximum speed.

14. In a gravity conveyor, a power source for operating the conveyor, a hydrodynamic brake having mechanical connection with said conveyor, a pump for continuously tending to supply liquid to said brake for circulation therethrough to render the brake effective for braking the conveyor, said pump being mechanically connected to the conveyor system to be driven therewith whereby said pump tends to progressively increase its output as the speed of operation of the conveyor increases, a valve for controlling the flow of liquid to said brake, means biasing said valve to closed position, and a pressure responsive device subject to pump outlet pressures for opening said valve to an extent proportional to the outlet pressure of the pump.

15. In a gravity conveyor, a power source for operating the conveyor, a hydrodynamic brake having mechanical connection with the conveyor, a non-positive displacement pump mechanically connected to the conveyor system to be driven thereby, a pipe connecting the outlet side of said pump to said brake to tend to supply water continuously thereto, a cut-off valve in said pipe, and a pressure responsive device for opening said valve, said pressure responsive device communicating with said pipe whereby pressures in such pipe above a predetermined point will operate said pressure responsive device to open said valve.

16. Apparatus constructed in accordance with claim 15 provided with speed responsive means connected to said conveyor system for rendering said power source inoperative approximately simultaneously with initial opening movement of said valve.

17. In a gravity conveyor, a power source for operating the conveyor, a hydrodynamic brake having mechanical connection with the conveyor, a positive displacement pump mechanically connected to the conveyor system to be driven thereby, a pipe connecting the outlet side of said pump to said brake to tend to supply water continuously thereto, a cut-off valve in said pipe, a pressure responsive device for opening said valve, said pressure responsive device communicating with said pipe whereby pressures in such pipe above a predetermined point will operate said pressure responsive device to open said valve, a by-pass pipe connected at one end to said first named pipe between said pump and said valve, and means for restricting the flow of liquid through said by-pass pipe whereby pump outlet pressures necessary to operate said pressure responsive device will not occur until the pump displacement exceeds the flow capacity of said restricting means.

GEORGE E. DAKE.
EDGAR F. SPEIDEN.

REFERENCES CITED

The following references are of record in the file of this patent:

UNITED STATES PATENTS

| Number | Name | Date |
|---|---|---|
| 1,985,889 | De La Mater et al. | Jan. 1, 1935 |
| 1,166,679 | Handy | Jan. 4, 1916 |

FOREIGN PATENTS

| Number | Country | Date |
|---|---|---|
| 801,955 | France | May 30, 1936 |
| 537,867 | Germany | Nov. 7, 1931 |